United States Patent [19]

Pioch

[11] Patent Number: 5,534,853
[45] Date of Patent: Jul. 9, 1996

[54] ELECTRONIC APPARATUS FOR MEASURING THE PARAMETERS OF AN OIL TRANSFORMER

[75] Inventor: Olivier Pioch, Nice, France

[73] Assignee: Pioch S.A., Carros Cedex, France

[21] Appl. No.: 90,081

[22] PCT Filed: Nov. 16, 1992

[86] PCT No.: PCT/FR92/01067

§ 371 Date: Jul. 21, 1993

§ 102(e) Date: Jul. 21, 1993

[87] PCT Pub. No.: WO93/10587

PCT Pub. Date: May 27, 1993

[30] Foreign Application Priority Data

Nov. 22, 1991 [FR] France ................... 91 14600

[51] Int. Cl.⁶ ................................. G08B 21/00
[52] U.S. Cl. .................. 340/646; 340/635; 340/624; 340/626; 340/664; 340/691; 324/726; 361/37; 73/305
[58] Field of Search .................. 340/635, 646, 340/657, 691, 624, 584, 664, 626; 324/726, 547; 361/35–37; 73/305, 307, 308, 323; 374/152

[56] References Cited

U.S. PATENT DOCUMENTS

| | | | |
|---|---|---|---|
| 3,816,801 | 6/1974 | Almand, III | 361/37 |
| 4,005,341 | 1/1977 | Uptegraff, Jr. et al. | 361/37 |
| 4,223,364 | 9/1980 | Sangster | 361/37 |
| 4,249,170 | 2/1981 | Cham et al. | 340/646 |
| 4,419,619 | 12/1983 | Jindrick et al. | 340/646 |
| 4,654,806 | 3/1987 | Poyser et al. | 340/646 |
| 4,823,224 | 4/1989 | Hagerman et al. | 361/37 |
| 5,078,078 | 1/1992 | Cuk | 361/37 |

FOREIGN PATENT DOCUMENTS

| | | |
|---|---|---|
| 306845 | 4/1973 | Austria . |
| 0219790 | 4/1987 | European Pat. Off. . |
| 2273390 | 12/1975 | France . |
| 241162 | 11/1986 | Germany . |
| 61-274274 | 4/1987 | Japan . |

*Primary Examiner*—Brent A. Swarthout
*Assistant Examiner*—Daniel J. Wu
*Attorney, Agent, or Firm*—Popham, Haik, Schnobrich & Kaufman

[57] ABSTRACT

The invention relates to an electronic apparatus fastened on an oil transformer, which measures with precision, continuously and simultaneously the value of the temperature, of the level of the dielectric liquid contained in the transformer, of the pressure inside the transformer and of the current-strength at the transformer secondary. With this measure of the four parameters are associated the continuous memorization of these measures over 24 hours, the visualization of these memorized measures on the apparatus or at distance on a peripheral equipment connected to the apparatus as well as the control of an alarm system and of a stop system of the transformer for each parameter.

10 Claims, 1 Drawing Sheet

ELECTRONIC APPARATUS FOR MEASURING THE PARAMETERS OF AN OIL TRANSFORMER

The oil transformer technology is more and more efficient and requires an adequate protection against the risk of damage and destruction due to a running trouble. Present means of monitoring and protecting oil transformer consist in mechanical or electrical instruments, without a data storage, without a systematic control of an alarm or of a stop system, monitoring several running parameters without any precise measure.

BRIEF DESCRIPTION OF THE DRAWINGS

The invention is better understood by reading the following Detailed Description of the Preferred Embodiments with reference to the accompanying drawing figures, in which like reference numerals refer to like elements throughout, and in which.

DETAILED DESCRIPTION OF THE PREFERRED EMBODIMENT

Figure 2:
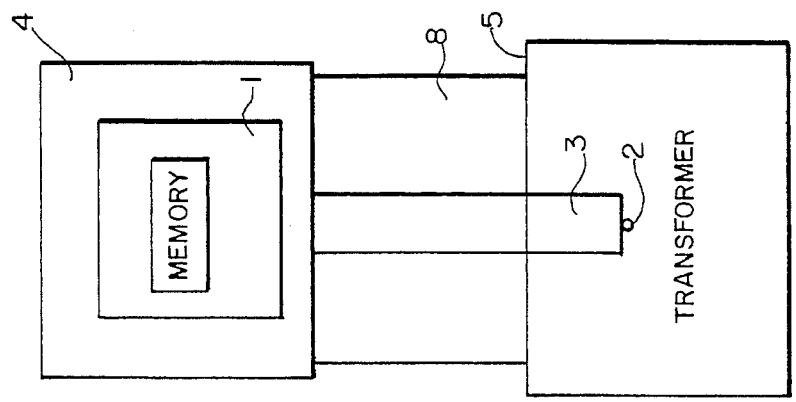
FIG. 2 is a diagrammatic view of the upper and lower parts of the apparatus in association with a transformer.

The present invention relates to an electronic apparatus composed of a single element comprising all the functions of measure, memorization, display alarm and stop tripping of four running parameters of the oil transformer.

The measures of the value of the running parameters are real and continuous measures over 24 hours.

The apparatus continuously and simultaneously measures over 24 hours the values of the temperature and of the level of the dielectric fluid contained in the transformer, the value of the pressure inside the transformer and of the current-strength at the transformer secondary thanks to independent equipments connected to an electronic system (1) and running permanently, the apparatus being fed by the transformer that receives it, or by its control cabinet.

The temperature of the dielectric liquid contained in the transformer is measured with a precision of ±0.5° C. thanks to an electronic sensor (2) located at the end of a vertical printed circuit board (3) attached under the base of the removable upper part (4) of the apparatus and penetrating to 30 mm under the inner wall (5) of the transformer. This location of the sensor, near by the hottest area of the transformer, allowing thus an optimal measure of the dielectric liquid temperature, is made possible thanks to the plastic composing the body of the apparatus that ensures its thermal and electrical insulation, and thanks to the weak penetration of the lower part of the apparatus, under the clamps (6) inside the transformer.

The pressure inside the transformer is measured with a precision of ±0.02 bar thanks to an electronic sensor (7) attached under the base of the upper part (4) of the apparatus and located in the lower part (8) of the apparatus-that communicates with the inside of the transformer.

The dielectric fluid level inside the transformer is measured with a precision of 5 cm$^3$ and is given in percentage of the volume contained in the lower part (8)-of the apparatus thanks to electronic sensors (9) located on the vertical printed circuit board (3) and actuated by a magnet (10) sunk in a float (11) sliding around the vertical printed circuit board (3), the whole being located in the lower part (8) of the apparatus, which is transparent and is used as a dielectric fluid reservoir, because of its communication with the inside of the transformer.

With this measure of the dielectric level is associated a measure of the level variation speed, from the measure of the time passed between two successive positions of the float, thanks to an electronic clock located in the electronic system (1) allowing thus to measure rapid variations of level due to a gas development in the transformer or to a leak of dielectric fluid.

The current-strength at the secondary of the transformer is measured thanks to a current transformer (12) surrounding the secondary terminals (13) and solid with the low-voltage bushing (rectangular type or other) of the transformer to be controlled.

With this measure of the current-strength is associated an electronic measure of the time during which this current-strength is applied, allowing to differentiate the tolerable overcurrents from those that are dangerous for the transformer, in terms of the time during which they were applied.

With this function of continuous measure of the parameters is associated a function of continuous storing of these measures, thanks to an electronic memory located in the electronic system (1), which memorizes the measures during 24 hours.

In case of switching off the transformer, the data memorized during the last 24 hours are safeguarded during several years. With these functions of continuous measure and memorization is associated a function of display of the memorized data driven by an operator thanks to an electronic system (1), connected either to a driving keyboard (14) and a displayer (15), located on the upper part (4) of the apparatus, allowing to see directly on the apparatus only the last memorized value for the required parameter, or to two outputs (16) and (17) ensuring the same functions as the driving keyboard (14) and allowing to connect the apparatus to peripheral equipments (computer, printer, minitel or others) that visualize all the values memorized in process of time and that can also represent these values in form of curves and charts corresponding to the transformer running. The output (16) located on the top of the apparatus allows, thanks to a connection to a peripheral equipment, a reading on the transformer setting up place. The output (17) placed on the side of the apparatus allows, thanks to the peripheral equipment connection, a reading at a distance from the transformer cell, in security.

In case of switching off the transformer, the memorized data can be displayed without connecting the apparatus to the mains, the apparatus running in stand-by during 10 hours thanks to an accumulator.

The data regarding the gas development can only be displayed by the mean of a peripheral equipment connected to the apparatus and which allows to plot a curve or a data chart.

With these functions of measure, continuous memorization and display is associated the control of an alarm for each parameter thanks to a threshold programmed by the fitter by the mean of the keyboard (14) located on the apparatus, and which operates, when it is reached for the given parameter, a relay allowing to trip an alarm signal located outside the apparatus (siren bulb . . . ) by the mean of an output (18). The alarm signal stays in action as long as the value of the parameter is higher than the alarm threshold value.

The gas development is not assorted to any alarm threshold, but this one being caused by a short circuit in the windings, entailing an insulator breakdown it will act on the values of the current-strength and of the dielectric level, for which alarm thresholds are foreseen.

With these functions of measure, memorization, visualization and control of an alarm is associated the control of a transformer stop system thanks to a switching-off threshold programmed by the fitter by the means of the driving keyboard (14) and which actuates, when it is reached, a relay allowing to cause by the means of an output (19) the disconnecting of the transformer.

As regards the current-strength parameter, the stop threshold consists in a maximal current-strength threshold associated with a maximal time during which this maximal threshold can be applied.

The gas development is not assorted to any alarm threshold, but it will act on the values of the dielectric level and on the current-strength, for which stop thresholds are foreseen.

A clock located in the electronic system (1) allows to display the time spent since the disconnecting of the transformer. The electronic system (1) allows 4 electroluminiscent diodes (20) located on the instrument and corresponding to the four parameters to light in turn in case of running and to go out in case of disconnecting, letting the only electroluminiscent diode corresponding to the implicated parameter blink, allowing thus to determine the parameter having caused the disconnecting of the transformer.

A drain (21) equipped with a valve, and located on the side of the apparatus allows to drain the transformer in case of over-pressure inside the transformer. In the event of the dielectric level being too low, the transformer being cold, having no dielectric fluid to adjust the level, the drain allows, by connecting it to an aspirating pump, to elevate the level by creating a depression inside the transformer.

The apparatus is directly fastened on the transformer cover thanks to clamps (6) adapted to a hole that previously exists on the transformer cover (5), which makes the mounting of the instrument easy and inexpensive.

The apparatus is made of a moulded two-part plastic casing : an upper part (4) which is fastened on a lower part (8) by a fastener such as a quarter turn screw (23). The upper part is used as a filling plug. The lower part has a part under the clamps, that penetrates into the transformer.

The main user of the apparatus is the transformer manufacturer that fastens it on the transformer and will determine and programm the alarm and switching-off threshold for each parameter according to the main feature of the transformer to be equipped thanks to the driving keyboard (14) located on the apparatus. The apparatus is fed by the mean of the input cable (22) by the transformer that receives it or by its driving cabinet and it can bear overloads up to 380 V during a short period. The imperviousness of the apparatus, coming from its design and from the plastic whereof it is made, allows to mount it on transformers in outdoor as well as in indoor applications.

The alarms and the stop system will be connected to the apparatus by the fitter of the transformer.

Any action subsequent to the transformer setting up will be easily effected thanks to the driving keyboard (14) or to the peripheral equipment connected to the apparatus.

Figure 1:
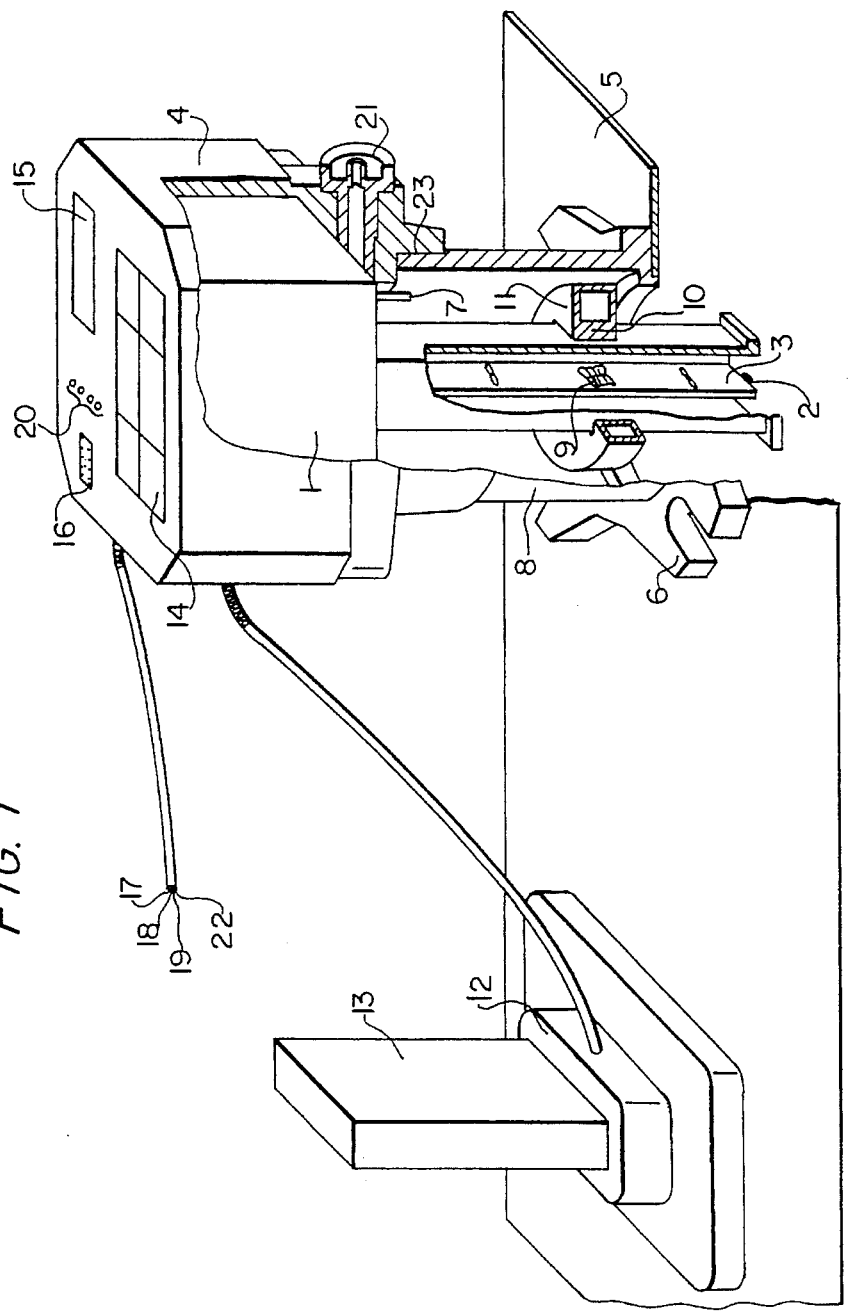
FIG. 1 is a perspective view, partially in cross-section, of electronic apparatus in accordance with the present invention.

The FIG. 1 represents the apparatus fastened to the transformer cover (5) thanks to clamps (6) and connected to a current transformer (12) surrounding the secondary terminals (13) of the transformer (5), the electroluminiscent diodes (20) corresponding to the four running parameters, the outputs (16) and (17) allowing to connect a peripheral equipment to the apparatus, the outputs (18) and (19) allowing to connect alarm and stop systems that are external to the apparatus, the input (22) feeding the apparatus. The lower part (8) of the apparatus includes the vertical printed circuit board (3), on which are fixed the temperature sensor (2) and the level sensor (9) for the dielectric fluid contained in the transformer (5), and around which slides the float (11) containing the magnet (10), as well as the pressure sensor (7) and the drain (21).

I claim:

1. A protective device for an oil transformer, including electronic apparatus for measuring parameters of the oil transformer, the oil transformer having an interior and a dielectric fluid in the interior, said protective device comprising:

a lower part fixed on the transformer, said lower part including a lower end penetrating into the interior of the transformer, said lower part being in communication with the interior of the transformer;

parameter measuring means in said lower part for continuously measuring a set of operating parameters of the transformer;

an upper part attached to and selectively separable from said lower part;

memory means in said upper part for storing the parameters measured by said measuring means; and monitoring means for monitoring the operation of the parameters;

said upper part and said lower part being made of a thermally and electrically insulating molded plastic and defining a separable, two-part casing.

2. The protective device of claim 1, said upper part and said lower part being connected by a fastener.

3. Electronic apparatus for measuring parameters of an oil transformer having an interior and a dielectric fluid in the interior, comprising:

a lower part fixed on the transformer, said lower part including a lower end penetrating into the interior of the transformer, wherein the dielectric fluid has a level and said lower part is transparent to show the dielectric fluid level in the transformer;

parameter measuring means in said lower part for continuously measuring a set of operating parameters of the transformer;

an upper part attached to said lower part;

memory means in said upper part for storing the parameters measured by said measuring means; and monitoring means for monitoring the operation of the parameters.

4. Electronic apparatus for measuring parameters of an oil transformer having an interior and a dielectric fluid in the interior, comprising:

a lower part fixed on the transformer, said lower part including a lower end penetrating into the interior of the transformer;

parameter measuring means in said lower part for continuously measuring a set of operating parameters of the transformer, wherein said parameter measuring means includes a vertical printed circuit board and a plurality of electronic level sensors provided on said vertical printed circuit board, said vertical printed circuit board having a lower end immersed in the dielectric fluid of the transformer;

an upper part attached to said lower part;

memory means in said upper part for storing the parameters measured by said measuring means; and monitoring means for monitoring the operation of the parameters.

5. The electronic apparatus of claim 4, wherein said lower part further comprises a float slidably mounted on said vertical printed circuit board, said float having a magnet therein for activating said level sensors to produce a continuous measurement of the dielectric fluid level of the transformer.

6. The electronic apparatus of claim 5, wherein the dielectric fluid has a level, said parameter measuring means including a level measuring means for measuring the variation of the dielectric fluid level of the transformer, wherein said level measuring means including an electronic system for measuring the time passed between two successive positions of said float.

7. Electronic apparatus for measuring parameters of an oil transformer having an interior and a dielectric fluid in the interior, comprising:

a lower part fixed on the transformer, said lower part including a lower end penetrating into the interior of the transformer;

parameter measuring means in said lower part for continuously measuring a set of operating parameters of the transformer, said parameter measuring means including a vertical printed circuit board and an electronic temperature sensor for measuring the temperature of the dielectric fluid of the transformer, said vertical printed circuit board having a lower end immersed in the dielectric fluid of the transformer and said electronic temperature sensor being situated at said lower end of the said vertical printed circuit board;

an upper part attached to said lower part;

memory means in said upper part for storing the parameters measured by said measuring means; and monitoring means for monitoring the operation of the parameters.

8. Electronic apparatus for measuring parameters of an oil transformer having an interior, a dielectric fluid in the interior, and a secondary current, said apparatus comprising:

a lower part fixed on the transformer, said lower part including a lower end penetrating into the interior of the transformer;

parameter measuring means in said lower part for continuously measuring a set of operating parameters of the transformer;

an upper part attached to said lower part;

memory means in said upper part for storing the parameters measured by said measuring means; and monitoring means for monitoring the operation of the parameters;

current measuring means for measuring the intensity of the secondary current of the transformer; and means for measuring the time during which the intensity is applied, whereby tolerable currents can be differentiated from intolerable ones by associating the measurement of the intensity of the secondary current with a measurement of the time during which the intensity is applied.

9. The protective device of claim 1, further comprising pressure measuring means for continuously measuring the pressure of the dielectric fluid, said pressure measuring means comprising an electronic pressure sensor located in said lower part under said upper part.

10. Electronic apparatus for measuring parameters of an oil transformer having an interior and a dielectric fluid in the interior, comprising:

a lower part fixed on the transformer, said lower part including a lower end penetrating into the interior of the transformer;

parameter measuring means in said lower part for continuously measuring a set of operating parameters of the transformer;

an upper part attached to said lower part;

memory means in said upper part for storing the parameters measured by said measuring means; and monitoring means for monitoring the operation of the parameters, wherein said monitoring means comprises:

a keyboard for programming an alarm threshold for each parameter, and for selecting a parameter to be displayed;

a display glass for displaying the last stored value of the selected parameter;

a plurality of electroluminiscent diodes, each said electroluminiscent diode corresponding to one parameter; and connecting means for connecting said apparatus to peripheral equipment for displaying all stored values of the parameters;

wherein said electroluminiscent diodes light when the transformer is operating, and blink when the corresponding parameters rise above their programmed alarm thresholds.

* * * * *